Sept. 3, 1968    R. L. DEMMER    3,399,779

CONTINUOUS BELT-TYPE FILTER ARRANGEMENT

Filed Feb. 15, 1966

INVENTOR,
RAYMOND L. DEMMER

BY Watson, Cole, Grindle & Watson
ATTORNEYS

United States Patent Office 3,399,779
Patented Sept. 3, 1968

3,399,779
CONTINUOUS BELT-TYPE FILTER ARRANGEMENT
Raymond L. Demmer, Ogdensburg, N.J., assignor to Komline-Sanderson Engineering Corporation, Peapack, N.J., a corporation of New Jersey
Filed Feb. 15, 1966, Ser. No. 527,599
7 Claims. (Cl. 210—391)

ABSTRACT OF THE DISCLOSURE

A filter arrangement including a hollow roll with apertures in the surface to cause liquid trapped in the web to pass to the interior of the roll and out the open ends of the roll by gravity. The apertures are advantageously spaced and formed, end flanges are provided on the roll, and specially placed spray nozzles are included to encourage flow of liquid to the interior of the roll and free of the web.

---

The present invention relates to a continuous belt-type filter unit and, more particularly, to such a filter unit having means for maintaining the filter belt substantially free of the liquid deposits thereby eliminating a cause of misalignment of said belt.

One problem that has long been present in the vacuum filtering art for separating a solid from a liquid is the problem of maintaining alignment of the continuous filter belt that moves in an endless path over a rotary vacuum drum, and either a two or three roll discharge system including in either case a parallel wash roll and a return roll and in the case of the latter mentioned system, an additional discharge roll separate from the wash roll. One cause of misalignment of the web in these filter units is the result of the added weight of the filter cake which is deposited on the filter belt. This causes a leading or trailing bow condition in the filter belt thereby pulling the sides of said filter belt out of alignment with the center and destroying the belt alignment. This particular cause of misalignment has been corrected by an invention disclosed in a co-pending application of Walter H. Sanderson that is assigned to the present assignee and entitled "Anti-Bow Bar Assembly," filed Nov. 22, 1965, Ser. No. 509,025.

It has recently been discovered that another cumulative cause of this type of tracking problem in these filter units involves the added weight of the filtrate liquid that becomes trapped in the pores or interstices of the filter web as it moves through the endless path around the wash roll and the vacuum drum of the filter unit. Further, it has been discovered that this problem of accumulation of water bags or deposits of water in the interstices of the filter belt is compounded by the wash water that is sprayed on the cloth for cleaning purposes, especially if the water is sprayed on the top side of the belt.

On some of the more expensive filter units this condition of misalignment of the filter belts by water being trapped in said belt has been somewhat alleviated but not corrected by applying pressurized fluid to the interior of a perforated wash roll to reversely blow the trapped water out of the belt, as shown in the patent to Mauss, 1,612,873, issued Jan. 4, 1927. In addition to this type of arrangement being more expensive to fabricate and operate, this continuous pressurized force on the filter belt causes the web fibers to be disturbed and weakened which can eventually cause less efficient operation and even premature failure of the web. Further, the problem of misting caused by the blowing of the fluid from the belt is substantial and can cause considerable damage to surrounding equipment and annoyance to operating personnel.

Thus, it is one object of the present invention to provide a means to eliminate the problem of liquid deposits in the filter belt of a continuous belt-type filter without the above described disadvantages.

It is another object of the present invention to provide a continuous belt-type filter unit having a self-bailing wash roll that is simple in construction and inexpensive to operate and maintain.

It is still another object of the present invention to provide a continuous belt-type filter unit wherein the filter belt is looped around a wash roll that is positioned parallel to the vacuum drum, which roll is formed with spaced rows of apertures to allow the liquid trapped in the filter belt to pass to the interior of said roll and thence out the ends of said roll to prevent build-up of said liquid in said filter belt and entrapment of said liquid between said belt and said roll.

According to the preferred embodiment of the invention illustrated, the filter unit includes a rotary vacuum drum, a wash roll and a filter belt looped tautly around said drum and said roll for movement in an endless path. The wash roll is formed by a hollow cylindrical member having a plurality of relief apertures formed therein to provide communication between the filter belt and the interior of said member. This communication between the filter belt and the interior of said cylindrical member provides a path to allow the liquid filtrate and/or wash water that is trapped in the filter belt to pass to the interior of said roll as the belt is pressed against the surface of the wash roll by the tautness in the filter belt. This, in turn, prevents build-up of the liquid between the belt and the roll and also eliminates the excessive weight of the water in the filter belt that tends to cause the filter belt to bow or sag in the middle. After the liquid has passed to the interior of the wash roll it is free to be released from the interior of said roll through an opening in at least one end of said roll. The apparatus of the invention preferably takes the form of both ends being formed completely open whereby the liquid is capable of being released or bailed at all angular positions of said roll.

Further, according to the present invention, the apertures of the self-bailing wash roll are arranged in a plurality of rows, which are spaced at substantially 90° intervals around the roll and with alternate rows being offset in the longitudinal direction along the axis of said roll so that substantially the total area of the belt will be exposed to a relief aperture during the continuous operation of the filter unit. Since the belt is looped about the wash roll so as to maintain contact over approximately 180° of the roll at one time, there are advantageously at least two rows of the apertures in the relief position at any one given time. This allows the liquid filtrate trapped in the belt as it leaves the vacuum drum as well as the liquid from the cleaning spray nozzle positioned on the opposite side of the roll to be removed to the interior of the roll at the same time.

In addition, in accordance with the present invention, each of the rows of apertures is capable of receiving liquid that might become trapped between the belt and the roll, for example, at the points where the filter belt is guided on and off the roll. This feature is particularly useful in the case where guiding flanges are used at the ends of the roll to help maintain the filter belt in alignment. Thus, with each 90° rotation of the wash roll a row of apertures is brought into engagement with these trapped pools of liquid which are then immediately passed freely through its perforated cylindrical surface to the interior of the wash roll and thence allowed to escape through the open ends of the roll.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

Referring now to the drawings.

Figure 1:
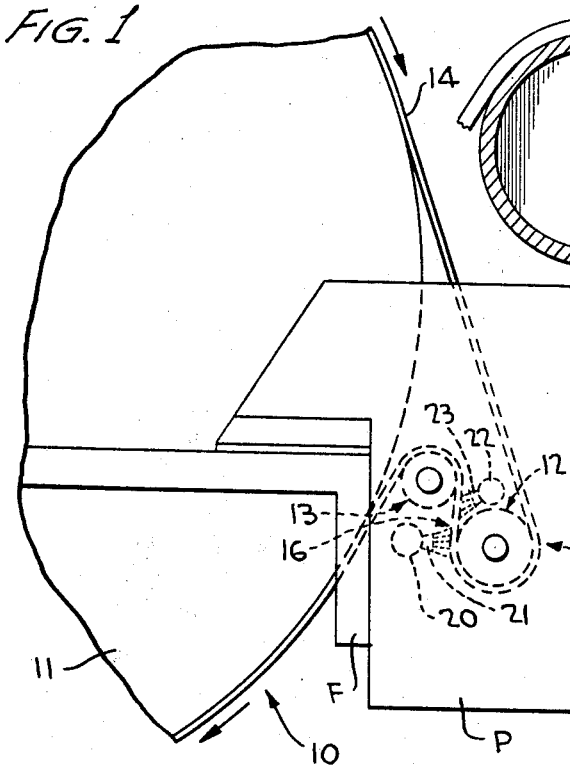
FIGURE 1 is a partial side elevation of the continuous belt-type filter unit constructed in accordance with the present invention.

Referring now in detail to the accompanying drawings, there is illustrated an organization of elements to which the teachings of the invention may be applied and which can be utilized to more fully describe the invention. More particularly, there is shown in FIGURE 1, a filter unit 10 that includes a rotary vacuum drum 11, a wash roll 12, and a return roll 13. Looped around the rotary vacuum drum 11 and the rolls 12, 13 in a taut manner is a porous filter belt 14 that travels in an endless path, as is well known in the art. The wash roll 12 and the return roll 13 are journaled for rotation adjacent their ends by suitable structure including a pair of mounting plates P (only one of which is shown), which mounting plates P are suitably carried by a main frame member F. Either or both of said rolls 12, 13 may be made vertically adjustable by well-known mechanism to provide for regulation of the tautness in the filter belt 14 and with the use of the apparatus of the present invention it has been found that the best performance can be obtained with substantially less belt tension than has heretofore been possible thus giving better belt life and less strain on the parts of the filter unit 10.

The foregoing general organization of the filter unit 10 is conventional and is designed to operate in the conventional manner; that is, the filter belt 14 is moved through a slurry from which a solid is to be separated and suitable suction means are provided in communication with the inside of the vacuum drum 11 to produce a sub-atmospheric pressure within the interior of said drum 11 to urge a liquid filtrate through the filter belt 14 and capture the solid parts of the slurry that form a filter cake C on the outer surfaces of said filter belt 14. As the filter belt 14 continues its endless path around the vacuum drum 11, the filtering process continues and eventually the filter belt 14 is directed away from the peripheral surface of the filter drum 11 and looped around the wash roll 12, in the manner indicated in FIG. 1. As the cake C approaches the wash roll 12 at an ingress point, indicated generally by the reference numeral 15, it is broken up by suitable conventional means, removed from the filter belt 14 and deposited for collection. The loop about the wash roll 12 is completed at an egress point, indicated generally by reference numeral 16, and then the filter belt is reversely looped about the return roll 13 whereupon it is returned to the outer peripheral surface of the vacuum drum 11 for a repeat of the filtering process.

Extending across the width of the filter belt 14 adjacent the wash roll 12 is a conventional manifold 20 that serves to spray cleaning liquid such as water onto the filter belt 14 through a plurality of suitable nozzles 21. If desired, an additional washing manifold 22 having nozzles 23 (FIG. 2) may be included within the loop of the belt 14 about the wash roll 12 to direct water against the underside of the belt 14 as it moves upwardly toward the return roll 13. In fact such an arrangement is sometimes preferred for the additional cleaning action or, if desired, the inside manifold can be used alone with the apparatus of the present invention.

Furthermore, it is now possible to use such an inside cleaning manifold in the unit 10 where the filter belt 14 is of a design wherein the pores or interstices of the belt 14 are small, that is wherein the belt rating is within the general range of ½ to 2 cubic feet per minute so that the water does not readily pass through said pores, whereas previously such a use has caused particularly serious alignment problems due to the large buildup of trapped wash water between the wash roll 12 and filter belt 14 at the egress point 16.

For illustrative purposes, assume that at the ingress point 15 of the loop of the filter belt 14 about the wash roll 12, there has been a substantial accumulation of water bags or deposits within the filter belt 14 as the filter cake C is formed, which water bags are indicated schematically by the reference numeral 19. As the filter belt 14 is looped downwardly around the wash roll 12 under tension, it is compressed so as to squeeze the water from the filter belt 14 that has been trapped in the form of said water bags 19. Also, it is noted that the conventional spray cleaning manifold 20 with its nozzles 21 along with the inside cleaning manifold 22 adds a substantial amount of wash water to the filter belt 14 generally in the region of the point 16 where the filter belt 14 begins its upward run to the return roll 13.

The wash roll 12 is preferably formed by a hollow cylindrical member 25 that has a plurality of rows of radially extending apertures 27 which provide the necessary communication between the filter belt 14 and the interior of said cylindrical member 25. As the filter web 14 is passed around the roll 12, the apertures 27 provide relief for the filtrate liquid that has been squeezed out of said filter belt 14 and trapped against said roll 12. Also, advantageously, after the pressurized water from the nozzles 21 has passed through said belt 14 and thus performed its intended purpose, it is conveniently removed via the apertures 27 of said wash roll 12. Furthermore at the same time, any liquid trapped against the roll 12 that has originated from the inside cleaning manifold 22 is removed.

As shown in the preferred embodiment illustrated, the apertures 27 are spaced substantially 90° apart so that if the filter belt 14 is looped around the roll 12 through at least 180° there are at all times two and sometimes three rows of said apertures 27 providing relief for the unwanted water in the pores of the filter belt 14 and the water trapped between the roll 12 and the filter belt 14 at the ingress and egress points 15, 16.

Figure 2:
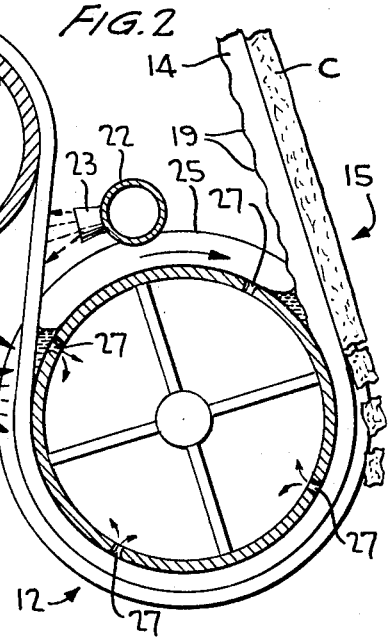
FIG. 2 is an enlarged fragmentary view in a section illustrating diagrammatically the relationship of the filter belt to the wash roll and the return roll of the filtering unit of FIG. 1.
Figure 3:
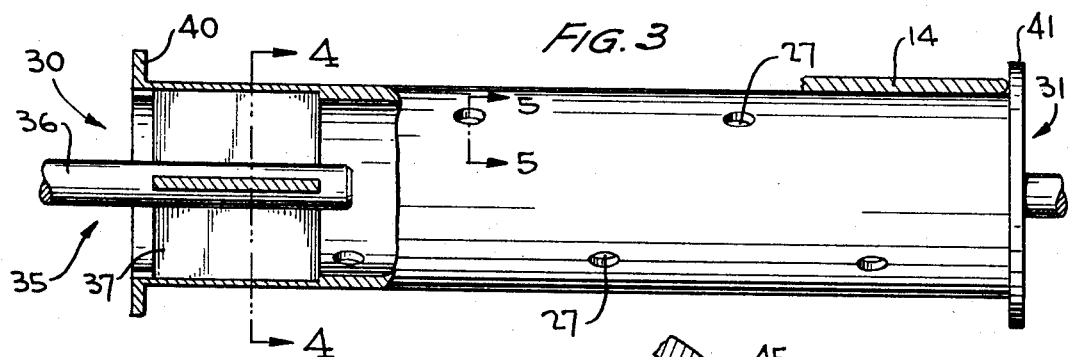
FIG. 3 is a detailed plan view partially in section illustrating the construction of the novel wash roll of the present invention.

After the water has passed to the interior of the roll as indicated by the arrows in FIG. 2, according to another feature of the present invention, the water is released through the open ends of the roll 12; said open ends being generally illustrated by the reference numerals 30, 31 in FIG. 3 of the drawings. Thus, it can be seen that after the liquid of the filter belt 14 has passed to the interior of the cylindrical member 25 the same can proceed in an outward direction to the open ends 30, 31 whereupon it will be conveniently discharged as the roll 12 rotates to a suitable container or drain (not shown). Indeed, the discharge operation is continuous since the water is relieved through the apertures 27 and escapes through the open ends 30, 31 at all angular positions of said roll 12.

Figure 4:
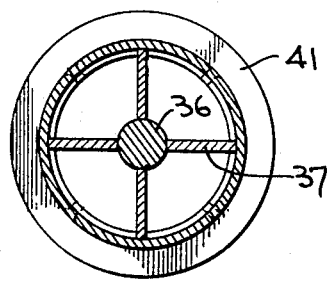
FIG. 4 is a cross-sectional view taken along line 4—4 of FIG. 3.

As can be seen in FIGS. 3 and 4, the end sections of the cylindrical member 25 adjacent the open ends 30, 31 have an increased inside diameter so as to be capable of receiving a support assembly 35, each of which may comprise a stubshaft 36 having a plurality of integral spider supports 37 that fit within said increased inside diameter.

Also, as best shown in these figures, the wash roll 12 of the preferred embodiment has a pair of upstanding flanges 40, 41 adjacent the open ends 30, 31, respectively, which flanges 40, 41 serve the purpose of aiding in the maintenance of the alignment of the filter belt 14. It will be realized that it is possible to utilize such flanges 40, 41 to operatively engage the edge of the filter belt 14 as shown in FIG. 3 since, according to the invention, the apertures 27 are operative to receive unwanted liquid trapped at points 15, 16 between the filter belt 14 and the roll 12. The liquid is then, of course released through the open ends 30, 31 of the roller 12 for disposal without further touching said belt 14.

Figure 5:
FIG. 5 is a cross-sectional view taken along line 5—5 of FIG. 3.

As shown in FIG. 5, the entrances to the apertures 27 are chamfered as at 45 so as to readily receive the liquid from the filter belt 14 as it is looped around the outer peripheral surface of the cylindrical member 25. It has been found in practice that any liquid removed from the filter belt 14 along the loop 15, 16 is forced to the nearest aperture 27 from all radial directions for passage through said aperture 27 to the interior of said roll 12 and out the open ends 30, 31. Further, this construction insures that the filter belt 14 will not be damaged by the apertures 27 with which said filter belt 14 cooperates in an intimate manner.

Thus, results and advantages of the present invention should now be clear to those skilled in the art in that a low-cost and efficient means is provided that eliminates a cause of misalignment of the filter belt 14, namely, the formation of excessive water deposits in said filter belt 14. If desired, the return roll 13 can be constructed in the same manner as the wash roll 12 for additional removal of excess liquid from the filter belt 14. In such a case, removal of the liquid would be accomplished while the filter belt 14 is flexed in both directions due to the forward loop 15, 16 around the wash roll 12 and the reverse loop around the return roll 13 and thus the elimination of the unwanted water bags 19 would tend to be more complete.

In this disclosure, there is shown and described only the preferred embodiment of the invention, but, as aforementioned, it is to be understood that the invention is capable of various changes or modifications within the scope of the inventive concept as expressed by the accompanying claims.

What is claimed is:

1. In a continuous belt-type filter unit for separating a solid from a liquid, a rotary vacuum drum, a roll mounted in spaced parallel relationship to said drum and a filter belt looped under tension around said drum and said roll for movement in an endless path, said roll being formed by a hollow cylindrical member, said member having a plurality of apertures formed therein to provide communication between said filter belt and the interior of said member to allow said liquid to pass to the interior of said roll whereby to prevent build-up of said liquid in said filter belt and between said belt and said roll, said roll having at least one end open to release said liquid from the interior of said roll and deposit the same free from said belt by gravity.

2. The combination of claim 1 wherein said cylindrical member is formed with both ends open so as to release said liquid from the interior of said roll by gravity at all angular positions of said roll at said both ends.

3. The combination of claim 2 wherein said cylindrical member is supported for rotation by a stubshaft and spider support at each of said open ends.

4. The combination of claim 1 wherein said apertures are arranged in approximately four rows across said cylindrical member, said rows being spaced apart around said member by substantially 90° and alternate rows being offset in the longitudinal direction along the axis of said member.

5. The combination of claim 4 wherein there is further provided upstanding flanges at the ends of said roll to align said filter belt and to cause the liquid on the inside of the loop about said wash roll adjacent both the ingress and egress points to be directed to said apertures for removal through said open ends of said roll.

6. The combination of claim 1 wherein is further provided an outside spray nozzle positioned in opposed relationship to the outside surface of the filter belt and substantially directly opposed to the wash roll at the egress end of the loop about said wash roll for directing pressurized fluid against said outside surface of the filter belt and through the belt whereby said liquid in said filter belt is directed to said apertures for removal through said open end of said roll.

7. The combination of claim 4 wherein the entrances of said apertures adjacent said belt are chamfered so as to readily receive said liquid from all directions.

References Cited

UNITED STATES PATENTS

| 82,735 | 10/1868 | Merrill | 210—386 |
| 864,828 | 9/1907 | Callow | 210—400 X |
| 2,916,145 | 12/1959 | Kaiser | 210—401 |
| 3,049,236 | 8/1962 | Lara et al. | 210—400 X |
| 3,077,990 | 2/1963 | Peterson | 210—401 |

REUBEN FRIEDMAN, *Primary Examiner.*

J. ADEE, *Assistant Examiner.*